United States Patent [19]
Oda et al.

[11] Patent Number: 5,323,380
[45] Date of Patent: Jun. 21, 1994

[54] INFORMATION RECORDING DISC AND SYSTEM

[75] Inventors: Toshiyuki Oda, Chigasaka; Takashi Takeuchi, Fujisawa, both of Japan

[73] Assignee: Hitachi, Ltd., Tokyo, Japan

[21] Appl. No.: 724,821

[22] Filed: Jul. 2, 1991

[30] Foreign Application Priority Data

Jul. 2, 1990 [JP] Japan .................................. 2-172759

[51] Int. Cl.$^5$ .................................................. G11B 7/24
[52] U.S. Cl. .................................. 369/275.1; 369/47; 369/48; 369/111
[58] Field of Search ...................... 369/275.1–275.4, 369/47, 48, 111

[56] References Cited

U.S. PATENT DOCUMENTS 4,975,898 12/1990 Yoshida .................................. 369/48
5,150,339 9/1992 Ueda et al. .............................. 369/32

FOREIGN PATENT DOCUMENTS

| 62-173630 | 7/1987 | Japan . |
| 1-023422 | 1/1989 | Japan . |
| 1-149240 | 6/1989 | Japan . |
| 2-141973 | 5/1990 | Japan . |
| 2-259922 | 10/1990 | Japan . |
| 2-281437 | 11/1990 | Japan .................................. 369/111 |

Primary Examiner—Hoa T. Nguyen
Attorney, Agent, or Firm—Antonelli, Terry, Stout & Kraus

[57] ABSTRACT

An information recording disc having at least two bands of information provided thereon. Each of the bands contain at least one track with one of the at least two bands being a read-only area band or a write area band along the one track of the one band. Another of the at least two bands is a mixed area band having at least one read-only area and at least one write area at different portions along the track of the mixed area band. An information system utilizes the disc for writing and reading information to and from the disc.

14 Claims, 6 Drawing Sheets

DISC STRUCTURE TABLE (ON TRACK 0)

| BAND AREA NO. | STARTING TRACK | TRACK COUNT | ATTRIBUTE |
|---|---|---|---|
| 1 | 1 | 1 0 | ROM |
| ⋮ | ⋮ | ⋮ | ⋮ |
| n−1 | 1 0 0 0 0 | 4 0 0 0 | RAM |
| n | 1 4 0 0 0 | 1 0 0 0 | MIXED |

DISC STRUCTURE TABLE (ON TRACK 0)

| BAND AREA NO. | STARTING TRACK | TRACK COUNT | ATTRIBUTE | ROM AREA |
|---|---|---|---|---|
| 1 | 1 | 10 | ROM | - |
| ⋮ | ⋮ | ⋮ | ⋮ | ⋮ |
| n-1 | 10000 | 4000 | RAM | - |
| n | 14000 | 1000 | MIXED | 0-8 |

DISC STRUCTURE TABLE (ON TRACK 0)

| BAND AREA NO. | STARTING TRACK | TRACK COUNT | ATTRIBUTE | SECTOR ATTRIBUTE FLAG |
|---|---|---|---|---|
| 1 | 1 | 10 | ROM | - |
| ⋮ | ⋮ | ⋮ | ⋮ | ⋮ |
| n-1 | 10000 | 4000 | RAM | - |
| n | 14000 | 1000 | MIXED | 1111000011110000 .. |

FIG. 4(B)

TRACK 14000 (BAND n)

FIG. 5(A)

RECORD OF BAND AREA NO. n IN DISC STRUCTURE TABLE

| BAND AREA NO. | STARTING TRACK | USER AREA TRACK COUNT | ALTERNATE AREA TRACK COUNT |
|---|---|---|---|
| n | 14000 | 990 | 10 |

| DISC STRUCTURE TABLE | | | | | |
|---|---|---|---|---|---|
| BAND AREA NO. | STARTING TRACK | TRACK COUNT | ATT. | SECTOR ATTRIBUTE FLAG | |
| | | | | INITIAL VALUE | CHANGED VALUE |
| n | 1 4 0 0 0 | 1 0 0 0 | READ/ WRITE | 111100000000.. | 0000.... |

TRACK 1 4 0 0 0 (INITIAL STATE)
 SECTOR
 0      3 4 5                                                   S-1
 | ROM AREA | RAM AREA |

FIG. 8(B)

| DISC STRUCTURE TABLE | | | | | |
|---|---|---|---|---|---|
| BAND AREA NO. | STARTING TRACK | TRACK COUNT | ATT. | SECTOR ATTRIBUTE FLAG | |
| | | | | INITIAL VALUE | CHANGED VALUE |
| n | 1 4 0 0 0 | 1 0 0 0 | READ/ WRITE | 111100000000.. | 11111111.. |

TRACK 1 4 0 0 0 (CHANGED STATE)
 SECTOR
 0         3 4 5 6 7 8 9                                        S-1
 | ROM AREA | RAM AREA |

INFORMATION RECORDING DISC AND SYSTEM

BACKGROUND OF THE INVENTION

The present invention relates to an information recording disc implemented as a disc type recording medium and, more particularly, to an information recording disc adapted to handle efficiently both large amounts of previously recorded data and additional information recorded thereon by a user.

One representative type of conventional optical disc is a CD-ROM (compact disc read only memory), which is a disc type recording medium. This type of disc is manufactured as follows: While an original disc is being cut, data signals are recorded thereon by use of a pit pattern of tiny bumps and dents. When finished, the original disc is copied so as to produce at low cost large quantities of optical discs containing the same data.

Recent developments in this field include writable optical discs whose contents may be deleted or overwritten with new data.

Where optical discs are used as the medium for providing users with programs or data, it takes too much time and cost to record the data on each disc one at a time for the individual users. Meanwhile, it is not a good practice of maintaining software resources if the user is to use and handle two discs separately: one being an optical disc cut from the original disc and containing the prerecorded program and/or data, and the other an optical disc on which the user records his own information.

One solution to the above dual disc disadvantage is proposed in Japanese Patent Laid-Open No. 62-173630. The disclosure envisages one optical disc comprising both read-only prerecorded data areas and data write areas, the latter being the domain in which the user may write his own data.

On the above optical disc, data is prerecorded on the read-only areas using the pit pattern of tiny bumps and dents when the disc is cut from its original. This prior art method of recording data makes it easier to copy optical discs containing data. The method also allows the user to record his own data onto the data write areas on the disc. Thus the time and the cost required for manufacture of the optical discs are reduced, and the discs produced in this manner are easy to maintain.

The above-described conventional optical disc has inner and outer concentric band type areas on the surface thereof. The inner areas are the read-only prerecorded data areas (ROM), and the outer areas are the data write areas (RAM) to which data may be added later. When writing and reading data to and from this optical disc, the system must use the predetermined read-only and data write areas. Thus, it is difficult to use one optical disc for different purposes depending on application programs. Further, where an application program handles large amounts of data, it is important to improve the throughput or the optical disc system. With the prior art disc, however, it takes time to move the pickup over the surface thereof for access to data.

SUMMARY OF THE INVENTION

It is therefore an object of the present invention to provide an information recording disc having a mixed area band including at least one read-only area and at least one write area located close to one other thereon along a track of the band, the read-only area containing a large amount of prerecorded data, and the write areas containing user-input data, the division status of these areas being minutely defined by area division control information for data control, wherein the system gains easy access to any of the data due to the reduced number of times it needs to gain access thereto.

It is another object of the present invention to provide an information recording disc on which the area division control information is located close to the read-only and/or write areas so that the time it takes the system to access any data is reduced.

In carrying out the invention and according to one aspect therefor, there is provided an information recording disc comprising a mixed band area constituted by fan-shaped read-only areas having the same sector number in the radial direction and by fan-shaped write areas having a sector number different from that of the read-only areas.

According to another aspect of the invention, the data prerecorded to the read-only areas uses a pit pattern. Further, the disc having the mixed area divided into a read-only area and a write area has the information about the disc division status written to an inner concentric portion thereof. Additionally, the disc has the information about the disc division status written to the beginning of an alternate write area of each band area thereof.

According to a further aspect of the invention, there is provided an information recording disc containing as mixed area division information the number of the sector acting as the boundary between the read-only area and the write area within the mixed area. Further, the mixed area division information may be provided as a flag per track which shows each sector to be either the read-only area or the write area.

According to another aspect of the invention, there is provided an information recording disc having each of the band areas thereof assigned an attribute, the attribute of a given band area showing that band area to comprise both a read-only area and an additional write area.

According to the present invention, when reading data from a recording medium, the system first gains access to inner tracks containing bad sector alternate information and band area division information. For a band area having a mixed area attribute, the division information is read from the specific location in which that information is written, at least before data starts being read from within that band area. Where the division information is located in the beginning of the alternate write area of each band area, that information is read along with the bad sector alternate information. Where the mixed area division information is recorded, no write operation is performed onto the read-only area.

These and further objects, features and advantages of the present invention will become more obvious from the following description when taken in connection with the accompanying drawings which show for purposes of illustration only, several embodiments in accordance with the present invention.

DETAILED DESCRIPTION OF THE PREFERRED EMBODIMENTS

Figure 1A:
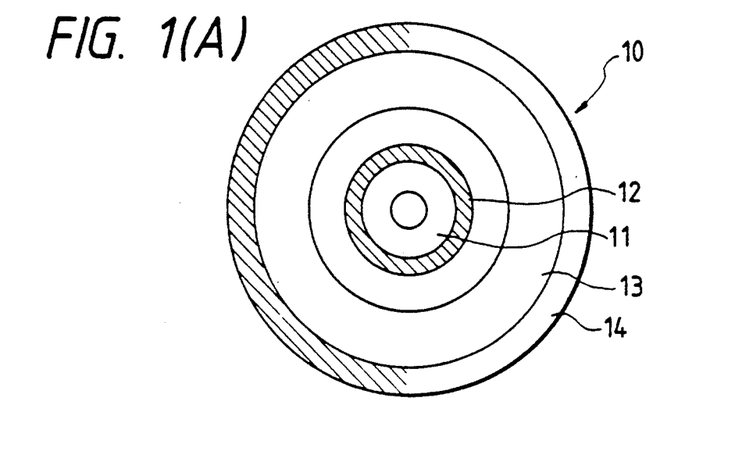
FIGS. 1(A)-1(C) are a set of views indicating how data is divided and recorded on an information recording disc according to an embodiment of the present invention.
Figure 1B:
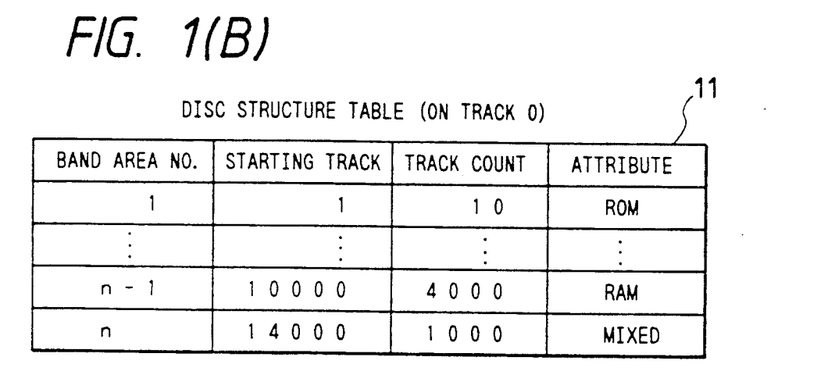
Figure 1C:
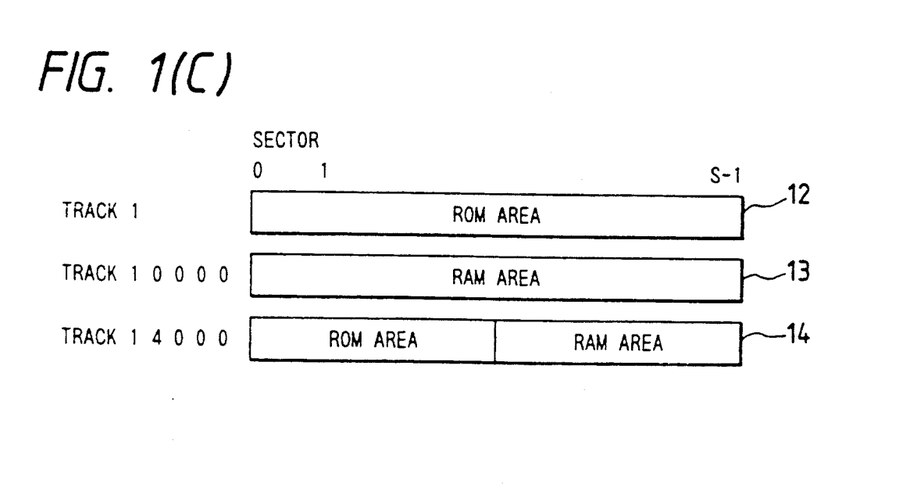
Figure 2:
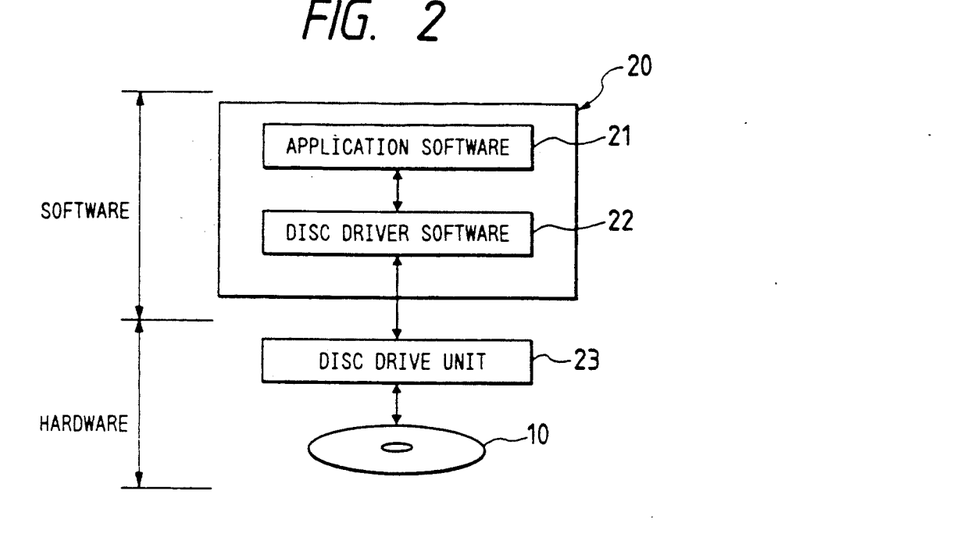
FIG. 2 is a system block diagram illustrating a typical system that utilizes the embodiment.

Referring now to the drawings, FIGS. 1(A)-1(C) are views showing how an information recording disc 10 is divided in accordance with the present invention and has data written to the divided areas thereof, while FIG. 2 is a block diagram of a system utilizing such an information recording disc. In FIG. 2, a host system 20 includes application programs or software 21 and a disc driver software 22 constituting a software portion, while a hardware portion is constituted by a disc drive unit 23 and an optical information recording disc 10. Under control of the host system 20, the disc drive unit 23 writes and reads data to and from the optical disc 10 and exchanges data with the disc driver software 22. The application software 21 may illustratively be an information retrieval and display program. The information contained on the optical disc 10 is accessed via the disc driver 22.

As shown in FIG. 1(A), the optical disc 10 is divided into "n" (n: natural number) band-shaped areas (called band areas). Each band area is assigned to a read-only area, a write area or a read/write mixed area. A disc structure table 11 is located in the innermost concentric portion of the disc, the table containing the location, size and attribute of each of the band areas.

In FIG. 1(A), the band areas are numbered 1 through "n" from the innermost concentric portion outward. An area 12 with band No. 1 is assigned as a read-only area (ROM), an area 13 with band No. n-1 is assigned as a write area (RAM), and an area 14 with band No. "n" is assigned as a mixed area (ROM and RAM). The mixed area is divided into a read-only area and a write area, with a sector acting as the boundary therebetween.

FIG. 1(B) is a view depicting the contents of the disc structure table 11. The disc structure table 11 is written on track 0 (innermost track) and contains the location, size and attribute of each band area. According to FIG. 1(B), band area No. 1 begins on track 1, is 10 tracks wide, and has the attribute of a read-only area.

FIG. 1(C) is a view illustrating how the first track of each area shown in FIG. 1(B) is divided. In FIG. 1(C), one track comprises "s"+1 sectors (s: natural number). As indicated, all sectors of band area No. 1 are assigned a read-only area; all sectors of band area No. n-1 are assigned a write area; and band area No. "n" is divided into a read-only area and a write area, with a sector acting as the boundary therebetween.

One advantage of the optical disc 10 is that if a large capacity database is created in the read-only area of a read/write mixed area, with the reference history of or the related information on the database contained in the write area thereof, a database having a learning capability may be constructed through access to data within the same tracks. Another advantage is that each band area may be used for any of diverse purposes, with a data retrieval program held in the read-only area of each band area and the user data written in the write area thereof.

A further advantage of the optical disc 10 is that an optical disc with its read-only areas formed using the pit pattern is conducive to having large quantities of copies thereof manufactured with ease, each copy containing large amounts of data. According to the invention, an application program and/or a database may be prerecorded on large quantities of discs, and the discs may be later customized by individual users adding their own data thereto.

Figure 3A:
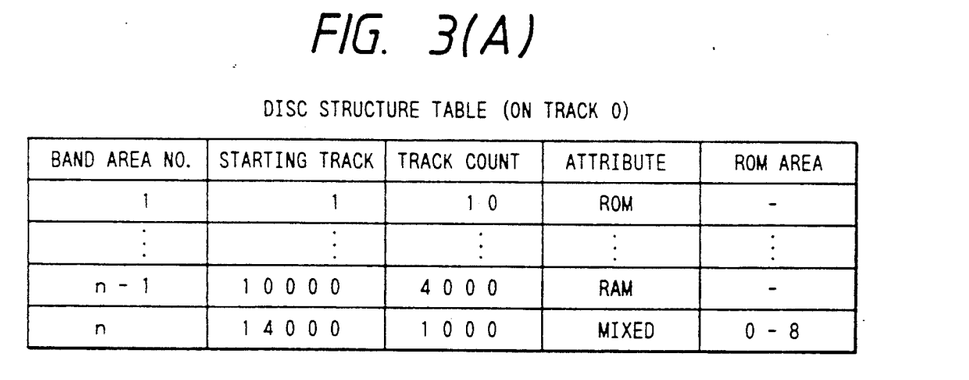
FIGS. 3(A)-3(B) are a set of view indicating how data is divided and recorded on an information recording disc according to another embodiment of the invention.
Figure 3B:
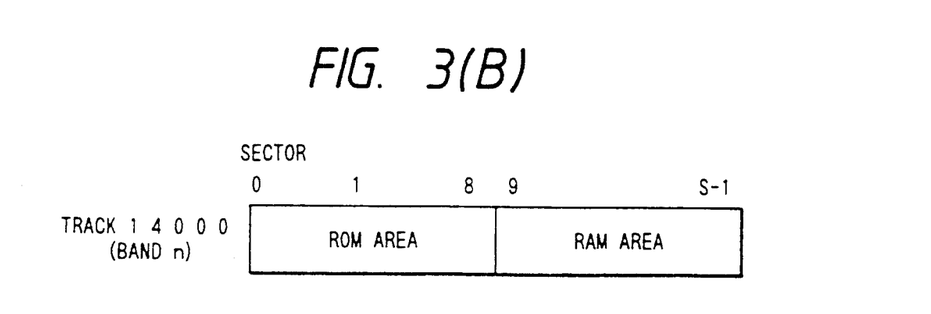

FIG. 3 is a set of views depicting how data is divided and recorded on an information recording disc according to another embodiment of the invention. FIG. 3(A) is a view showing the contents of a disc structure table recorded on track 0. As shown in FIG. 3(A), the content of the record corresponding to each band area include, in addition to that shown in FIG. 1, information indicating the location of a read-only area. As depicted in FIG. 3(B), band area No. "n" indicates that nine sectors numbered 0 through 8 make up the read-only area and that the other sectors numbered 9 through s-1 constitute the write area. Given that sector configuration, the information on the read-only area location is given as 0-8 as shown in FIG. 3(A).

As described, the innermost concentric portion of the same medium contains the information about how read-only and write areas are divided. Having the disc drive unit reference this information protects the data in the read-only area from being destroyed by unauthorized access from an application program.

With the disc structure table located in the innermost concentric portion of the disc, the optical pickup device is allowed to start acquiring the band area division information and read/write mixed area information immediately after returning to its home position in the innermost portion of the disc.

Figure 4A:
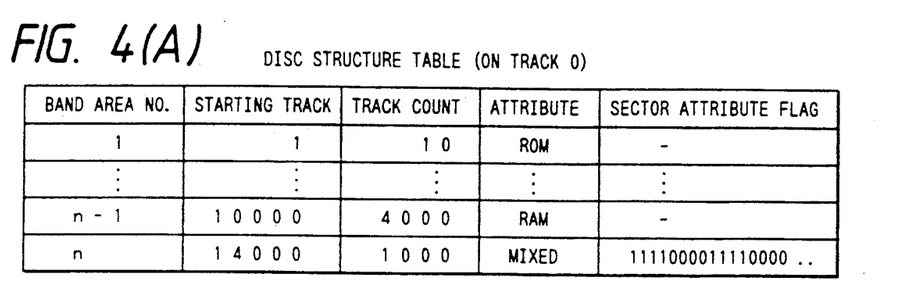
FIGS. 4(A)-4(B) are a set of views illustrating how data is divided and recorded on an information recording disc according to a further embodiment of the invention.
Figure 4B:
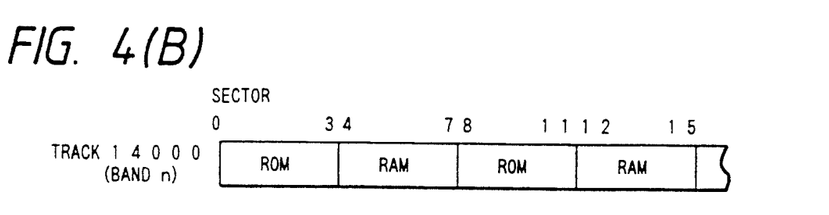

FIG. 4 is a set of views illustrating how data is divided and recorded on an information recording disc according to a further embodiment of the invention. FIG. 4(A) shows the contents of a disc structure table recorded on track 0. In FIG. 4(A), the contents of the record corresponding to each band area include, in addition to that shown in FIG. 1, the information indicating the location of a read-only area. As depicted in FIG. 4(B), band area No. "n" indicates that four sectors numbered 0 through 3 make up a read-only area, another four sectors numbered 4 through 7 constitute a write area, another four sectors numbered 8 through 11 represent another read-only area, and so on. That is, the sectors are divided in units of four to form alternated read-only areas and write areas four sectors wide each. Given that sector configuration, the information about the read-only area locations is given as 1/0 sector attribute flags, as shown in FIG. 4(A). When set to 0, a flag indicates a read-only area; when set to 1, the flag denotes a write area.

As a result, the effects of the invention described in connection with FIG. 3 are supplemented by the ability to divide read/write mixed band areas as desired according to the application program or the database structure.

As one variation of the above-mentioned embodiment, the mixed area information and the band division information need not be contained together in the disc structure table. As long as the two kinds of information are located close enough to each other, the advantage of data retrieval without track access remains unchanged. As another variation, the disc structure table may be located close to the home position of the optical pickup device, regardless of the home position being in the innermost or outermost concentric portion of the disc. As long as the pickup device has its home position located close to the disc structure table, the advantage of acquiring data of that table without track access remains unchanged. As a further variation, either the disc drive unit or the disc driver program may take on the task of controlling band area division information or of protecting read-only areas from data destruction. This is possible as long as the information control or data protection feature thus provided remains the same from the viewpoint of the application program in question.

Figure 5A:
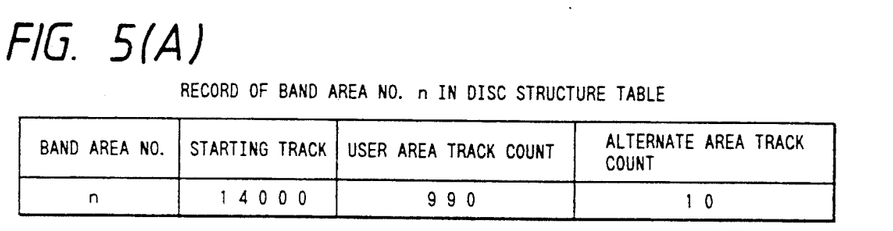
FIGS. 5(A)-5(B) are a set of views describing how data is divided and recorded on an information recording disc according to a still further embodiment of the invention.
Figure 5B:
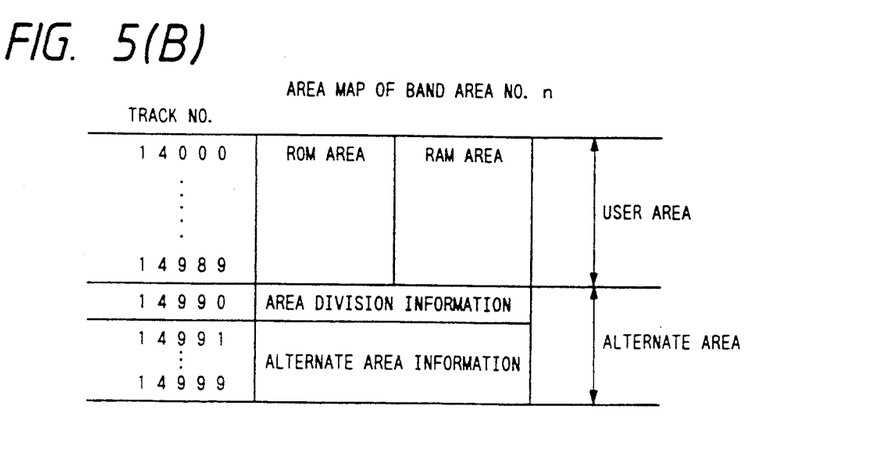

FIG. 5 is a set of views depicting how data is divided and recorded on an information recording disc according to another embodiment of the invention. FIG. 5(A) shows the contents of the record with band area No. "n" in the disc structure table recorded on track 0. In FIG. 5(A), the record contents include a band starting track number, an intra-band user area track count and an alternate area track count. To band area No. "n", as shown in FIG. 5(B), are assigned 990 tracks which are numbered 14,000 through 14,989 and which constitute a read/write mixed user area, and 10 tracks which are numbered 14,990 through 14,999 and which make up an alternate area. The starting track of the alternate area (track No. 14,990) contains read/write mixed area division information; the remaining tracks (Nos. 14,991-14,999) retain alternate area information. The division information was described earlier and any repetitive description thereof will be omitted. As described, the starting track number is 14,000, the intra-band user area track count is 990, and the alternate area track count is 10, all recorded as shown in FIG. 5(A).

If any error is detected in the data written in a band area, the disc drive unit writes correct data in an alternate area for recovery from the bad sector. If the application program requests recovery from a bad sector, the disc drive unit must read the corresponding alternate area information. In that case, the disc drive unit needs to acquire beforehand the alternate area information on each band area. If the division information is located close to the alternate area information (in FIG. 5, on the starting track of the alternate area), the two kinds of information may be read without track access.

With the above embodiment, the division information is recorded on the starting track of the alternate area. Alternatively, the division information may be located in the starting sector and the effects of the invention still remain the same.

Figure 6A:
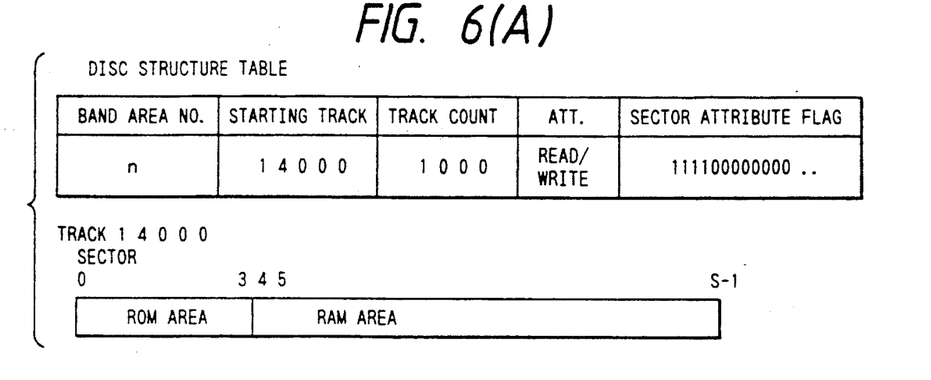
FIGS. 6(A)-6(C) are a set of views showing how data is divided and recorded on an information recording disc according to another embodiment of the invention.

FIG. 6 is a set of views showing how data is divided and recorded on an information recording disc according to still another embodiment of the invention. FIG. 6(A) illustrates the contents of the record with band area No. "n" in the disc structure table, along with the recording status of track 14,000 which is the starting track of band area No. "n". First, the sectors numbered 0 through 3 constitute a read-only area. A flag set to 1 is attached as a sector attribute flag to each of the first four sectors (the flags identifying the read-only area). A band attribute is also provided, indicating a read/write mixed area.

Figure 6B:
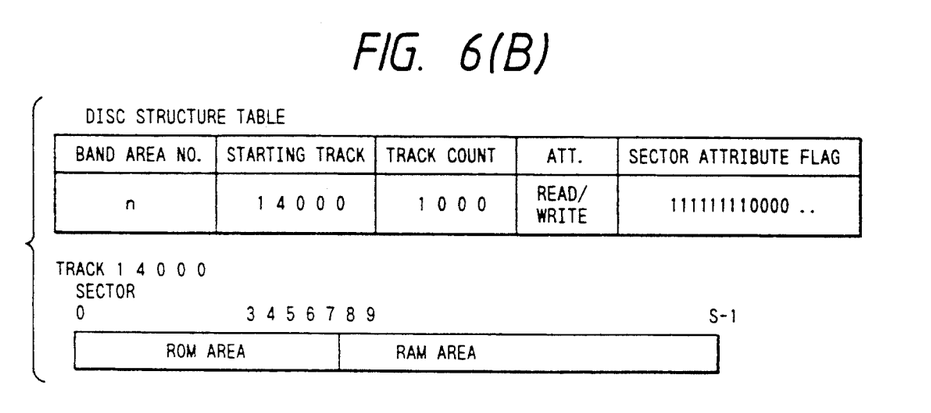

FIG. 6(B) depicts how data is added to the write area shown in FIG. 6(A). As indicated, the data added to the sectors 4 through 7 sets the corresponding sector attribute flags to 1 each. Thus, these sectors are turned into an additional read-only area and in this manner, the information recorded later is protected from destruction by write operations that may be attempted by the application program.

Figure 6C:
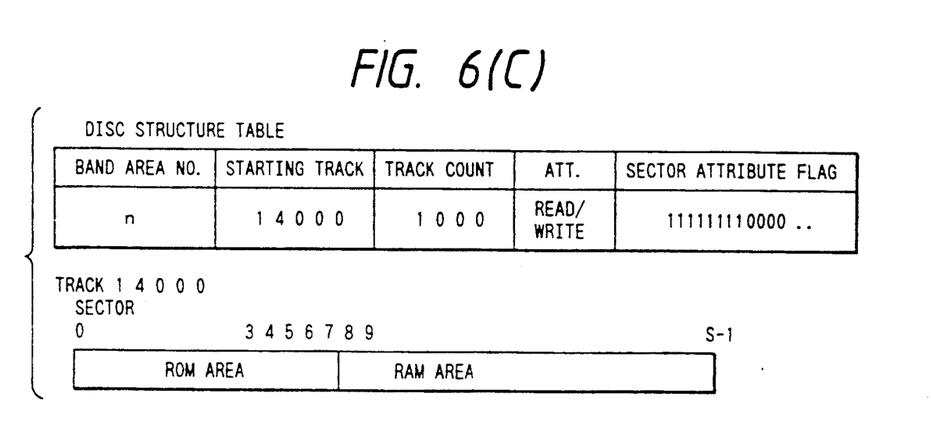

FIG. 6(C) illustrates how the data having been written as shown in FIG. 6(B) is subjected to subsequent processing. As shown in FIG. 6(C), the band attribute is changed to indicate a read/write mixed area indicated as read/re-write. This makes it possible to write or change data, as needed, in the sectors numbered 8 through s-1.

Figure 7:
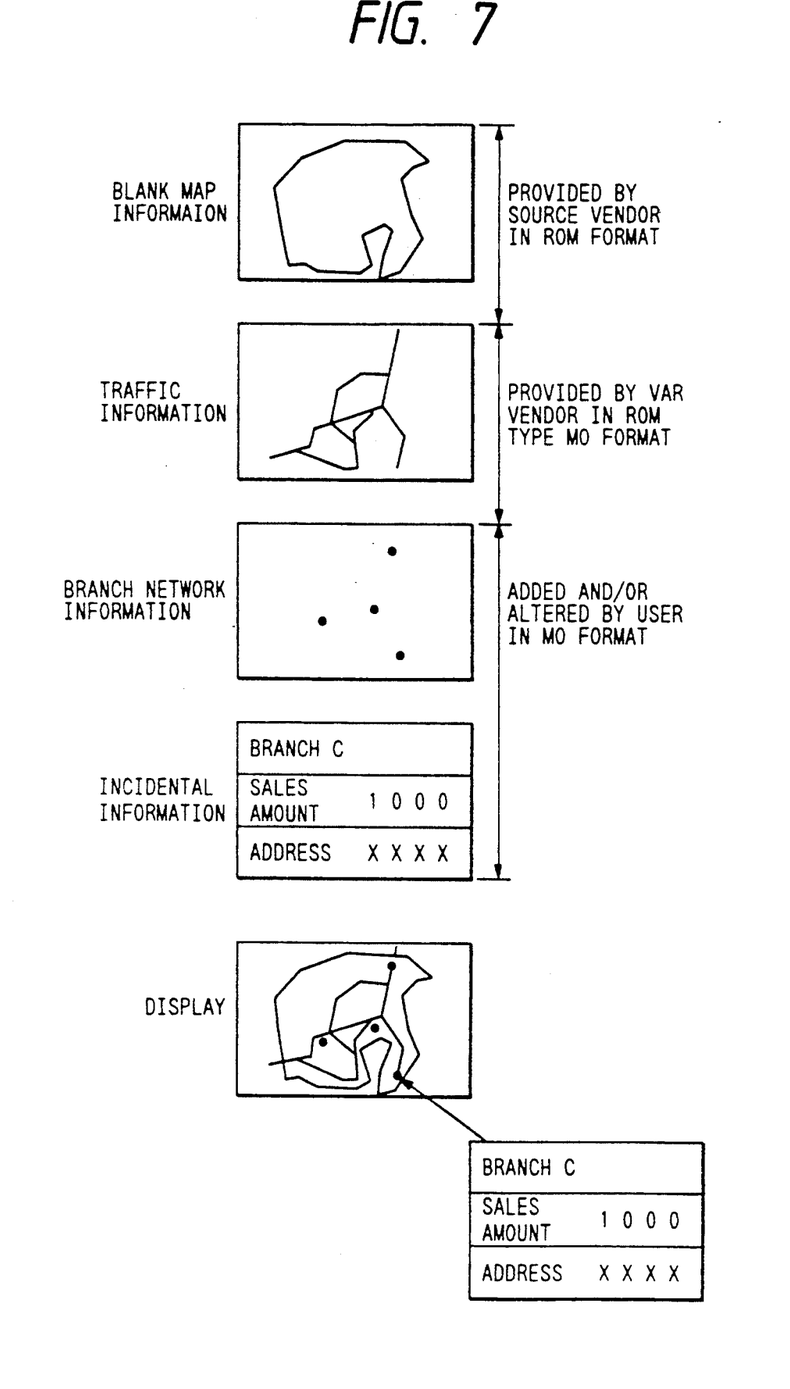
FIG. 7 illustrates how a database is typically constructed in accordance with the present invention.

FIG. 7 is a view showing how a database is illustratively constructed according to the invention. The database of FIG. 7 is basically a map database supplemented by diverse kinds of information. With reference to FIG. 7, the read-only areas on the optical disc constitute a ROM (read only memory) formed using a pit pattern; the write areas make up an MO (magneto-optical) memory in which data may be recorded or altered in a magneto-optical manner.

First, a source vendor records blank map information into a read-only area. At this point, as shown in FIG. 6(A), the band attribute identifying a read/write mixed area is provided; the blank map information is given a read-only area flag.

Next, a value added re-selling (VAR) vendor adds traffic information to the blank map information provided on the disc by the source vendor. As depicted in FIG. 6(C), the MO area to which the information was added is turned into a ROM before the disc is returned to the user.

The map database thus offered is later supplemented by the individual user adding such incidental information as user branch-related information, branch names, branch sales and others. The user-added information may be altered as needed.

The map database thus constructed allows traffic information, branch network information and other information to overlap with the blank map when reproduced on a display unit. Because the information added to the blank map is located on or close to the tracks containing the blank map information, the efficiency of data retrieval is enhanced.

Figure 8A:
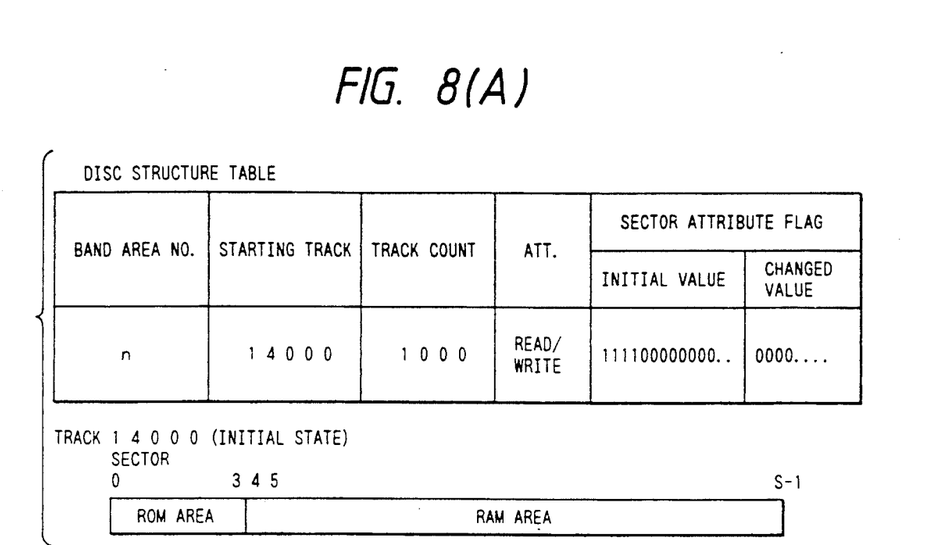
FIGS. 8(A)-8(B) are a set of views depicting how data is divided and recorded on an information recording disc according to a further embodiment of the invention.

FIG. 8 is a set of views depicting how data is divided and recorded in units of tracks on an information recording disc according to a further embodiment of the invention. FIG. 8(A) shows the contents of the record with band area No. "n" in the disc structure table, along with the recording status of track 14,000 which is the starting track or band area No. "n". First, the sectors numbered 0 through 3 constitute a read-only area. The sector attribute flags of the first four sectors are set to 1 each (the flags identifying the read-only area). The flags are recorded in an initial value recording area formed using a pit pattern. A band area attribute identifying a read/write mixed area is provided. Where the disc of FIG. 8 is to be read, the division information written in the initial value recording area is referenced because no track division information is recorded in a changed value recording area.

Figure 8B:
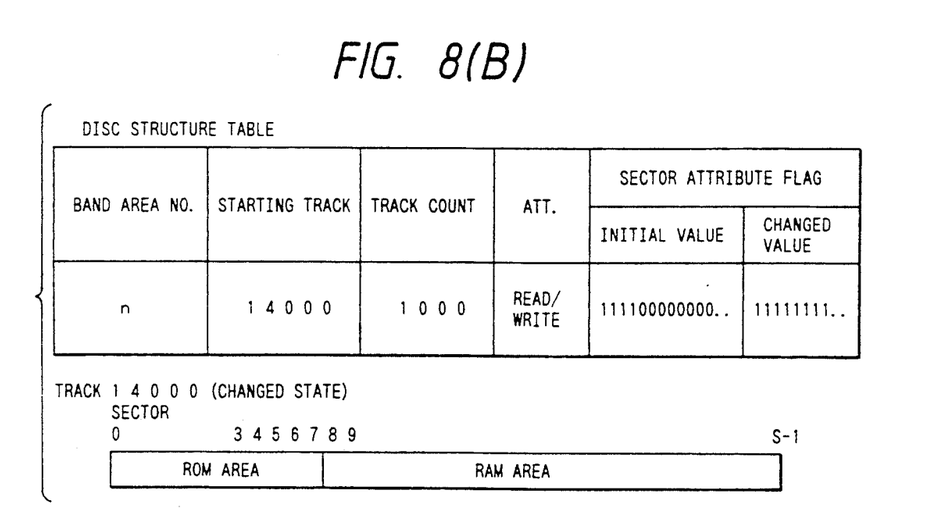

FIG. 8(B) illustrates recording status in which information is added to the write area of FIG. 8(A). As indicated, the data written to the sectors numbered 4 through 8 causes the corresponding sector attribute flags to be set to 1. The changed flags are written in the changed value recording area. The sectors are then included in the read-only area. Where the disc of FIG. 8(B) is to be read, the track division information contained in the changed value recording area is referenced, and the division information held in the initial value recording area is ignored. As a result, the subsequently added information is protected against destruction by write operations that may be attempted by the application program.

The above-described arrangement allows the track division information to be formed beforehand using the pit pattern. This makes it easy to copy discs containing read/write mixed areas. When user data is added to the write areas, the track division information may be changed accordingly.

The embodiments mentioned above are optical discs having their surfaces formed using pit patterns of bumps and dents. Alternatively, magnetic disc media may be utilized and still the advantage of an enhanced track access speed in reading and writing information remains the same as long as the media contain prerecorded data.

There may exist on the recording medium one or multiple read/write mixed band areas and the effects of the invention remain the same.

Where the host system is to write or read information to or from an optical disc formed according to the invention, the disc is divided into appropriate areas in accordance with the purpose of the application program in question. In this manner, both the read-only and the write areas may be used as needed on the disc.

With the mixed area division information located close to such disc structure description information as band division information and bad sector alternate information, a read-only area may be separated from a write area without resorting to the timing-consuming track access.

Since data may be prerecorded in read-only areas using the pit pattern, it is easy to copy optical discs containing large amounts of data.

The division information comprises flags identifying the read-only and write areas of the applicable tracks. This arrangement inhibits inadvertent overwrite operations onto any prerecorded read-only area, and permits the choice of a large capacity disc memory for user-specific usage.

As described, the read-only and write areas located close to one another make it possible to reduce the number of times large amounts of data are accessed for update. The division information for controlling the area configuration is minutely defined so that relevant control information is acquired before the host system gains access to data. This boosts the throughput available when the application program handles large amounts of data on disc. Because the division control information is located close to the read-only and write areas, the access time required to get the information is also reduced.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An information recording disc comprising at least two bands, each of the bands containing at least one track, one of the at least two bands being one of a read-only area band and a write area band along the at least one track of the one band, and another of the at least two bands being a mixed area band having at least one read-only area and at least one write area at different portions along the at least one track of the mixed area band, and at least one disc structure track including at least mixed track division information recorded therein, the mixed track division information enabling assignment of read-only and write areas to a sector number of the at least one track of the mixed area band.

2. An information recording disc according to claim 1, wherein the mixed track division information includes a mixed track division table, the table being recorded at one of an innermost and outermost concentric portion of the disc.

3. An information recording disc according to claim 1, wherein the mixed track division information is recorded at a predetermined position of the band areas corresponding thereto.

4. An information recording disc according to claim 1, wherein each band area includes a write area and an alternate write area, the beginning of the alternate write area corresponding to a predetermined position of the band areas, the predetermined position having the mixed track division information recorded therein.

5. An information recording disc according to claim 1, wherein each track of the mixed band area includes one read-only area and one write area, and the number of a sector acting as a boundary between the read-only area and the write area is recorded as the mixed track division information.

6. An information recording disc according to claim 1, wherein each sector of the mixed band area is assigned to one of a read-only area and a write area, the division information including a flag indicative of each sector to be assigned to one of the read-only area and the write area being recorded as the mixed track division information.

7. An information recording disc according to claim 1, wherein each sector of the mixed band area is assigned to one of a read-only area and a write area, and the division information includes a flag indicating assignment of each sector being recorded as the mixed track division information.

8. An information recording disc according to claim 1, wherein the mixed band area is provided with an attribute for identifying the mixed band area as containing a read-only area and an additional write area, the additional write area being a write area of the mixed band area, and after writing information to a sector of the write area, updating of the sector information is inhibited.

9. An information recording disc according to claim 1, wherein the mixed band area is provided with an attribute for identifying the mixed band area as containing a read-only area and an additional write area, the additional write area being a write area of the mixed band area, and after writing information to a sector of the write area, an attribute of the sector contained in the mixed track division information of the mixed band area is changed to indicate the sector as a read-only area.

10. An information recording disc according to claim 9, wherein the information recording disc has the read-only areas and the track division information previously recorded as a pit pattern on the surface thereof.

11. An information recording disc according to claim 10, wherein the track division information having a changed sector attribute is written immediately following the previously recorded pit pattern of track division information, the changed sector attribute being provided by additional writing of information to a write area of the mixed band area containing the read-only area and the write area of the disc.

12. An information recording disc according to claim 1, wherein the at least one disc structure track includes information of at least one of the read-only area band and the write area band.

13. An information recording disc to claim 1, wherein at least three bands are provided comprising at least three bands, each of the bands being in the form of a closed loop and containing at least one track, the at least three bands including at least one read-only area band, at least one write area band, and at least one mixed area band, the mixed area band having at least one read-only area and at least one write area at different portions along the one track of the mixed area band.

14. An information recording disc according to claim 13, further comprising at least one disc structure track having information of at least one of the read-only area band, the write area band and the mixed area band.

* * * * *